US012714940B2

(12) United States Patent
Couleaud et al.

(10) Patent No.: US 12,714,940 B2
(45) Date of Patent: Aug. 25, 2026

(54) METHODS AND SYSTEMS FOR GENERATING AN IN-GAME DISPLAY ELEMENT

(71) Applicant: Adeia Guides Inc., San Jose, CA (US)

(72) Inventors: Jean-Yves Couleaud, Mission Viejo, CA (US); Reda Harb, Tampa, FL (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 203 days.

(21) Appl. No.: 18/374,901

(22) Filed: Sep. 29, 2023

(65) Prior Publication Data

US 2025/0108308 A1 Apr. 3, 2025

(51) Int. Cl.

*A63F 13/79* (2014.01)
*A63F 13/533* (2014.01)
*A63F 13/5375* (2014.01)
*A63F 13/822* (2014.01)

(52) U.S. Cl.

CPC ............ *A63F 13/79* (2014.09); *A63F 13/533* (2014.09); *A63F 13/5375* (2014.09); *A63F 13/822* (2014.09); *A63F 2300/575* (2013.01)

(58) Field of Classification Search

CPC .... A63F 13/79; A63F 13/533; A63F 13/5375; A63F 13/822; A63F 13/35; A63F 13/795; A63F 2300/57

See application file for complete search history.

(56) References Cited

U.S. PATENT DOCUMENTS 8,052,520 B2 * 11/2011 Park ..................... G06Q 10/087 463/9
8,684,807 B1 * 4/2014 Crici ..................... A63F 13/92 434/350
11,083,966 B2 * 8/2021 Zhang ..................... A63F 13/352
11,806,631 B2 * 11/2023 Nair ..................... A63F 13/798
2005/0137015 A1 * 6/2005 Rogers ..................... A63F 13/12 463/42
2007/0117615 A1 * 5/2007 Van Luchene .......... A63F 13/35 463/25
2008/0139318 A1 * 6/2008 Van Luchene ........ A63F 13/795 463/42
2009/0318234 A1 * 12/2009 Christensen ............ A63F 13/10 463/42

(Continued)

OTHER PUBLICATIONS

When can I sell to npcs again? Hypixel.net. Online. Apr. 6, 2023. Accessed via the Internet. Accessed Aug. 6, 2025. <URL: https://hypixel.net/threads/when-can-i-sell-to-npcs-again.5326675/> (Year: 2023).*

(Continued)

*Primary Examiner* — Carl V Larsen
(74) *Attorney, Agent, or Firm* — HG LAW LLP

(57) ABSTRACT

Systems and methods are presented for generating an in-game display element for facilitating a transfer of an in-game item in a multiplayer video game. The system accesses and analyzes gameplay data associated with player actions to determine a correlation between player actions and in-game item types. A first player associated with an identified in-game item is determined, and an in-game display element is generated to facilitate the transfer of the item among the players.

20 Claims, 8 Drawing Sheets

(56) References Cited

U.S. PATENT DOCUMENTS

| | | | | |
|---|---|---|---|---|
| 2012/0077599 | A1* | 3/2012 | Van Luchene | A63F 13/533 463/42 |
| 2013/0143670 | A1* | 6/2013 | Junkin | A63F 13/65 463/42 |
| 2013/0339228 | A1* | 12/2013 | Shuster | G09G 5/377 705/40 |
| 2014/0162763 | A1* | 6/2014 | Kim | A63F 13/58 463/25 |
| 2016/0317916 | A1* | 11/2016 | Lightfoot | A63F 13/533 |
| 2018/0071624 | A1* | 3/2018 | Fukuda | A63F 13/32 |
| 2019/0192977 | A1* | 6/2019 | Eatedali | A63F 13/35 |
| 2021/0056603 | A1* | 2/2021 | Vidal | A63F 13/87 |
| 2022/0176251 | A1* | 6/2022 | Salik | A63F 13/35 |
| 2023/0024836 | A1* | 1/2023 | Bennett | G06N 20/00 |
| 2023/0182025 | A1* | 6/2023 | Benedetto | G06Q 20/123 463/42 |
| 2024/0424403 | A1* | 12/2024 | Takahashi | A63F 13/58 |
| 2025/0153053 | A1* | 5/2025 | Sipolins | A63F 13/79 |

OTHER PUBLICATIONS

"Star Wars: The Old Republic," WikipediA, [retrieved from URL: Republic: https://en.wikipedia.org/wiki/Star_Wars:_The_Old_Republic on Nov. 30, 2023], 22 pages.

"World of Warcraft", Wikipedia, [retrieved from URL: https://en.wikipedia.org/wiki/World_of_Warcraft on Nov. 30, 2023], 33 pages.

* cited by examiner

126

200
Server
n-204
210
Control Circuitry
Storage
214
Processing Circuitry
216
I/O Path
212
Communication Network(s)
208
Content Database
n-206
Computing Device
n-202
218
Control Circuitry
Storage
228
Processing Circuitry
230
I/O Path
220
Speaker
222
Display
224
User Input Interface
226

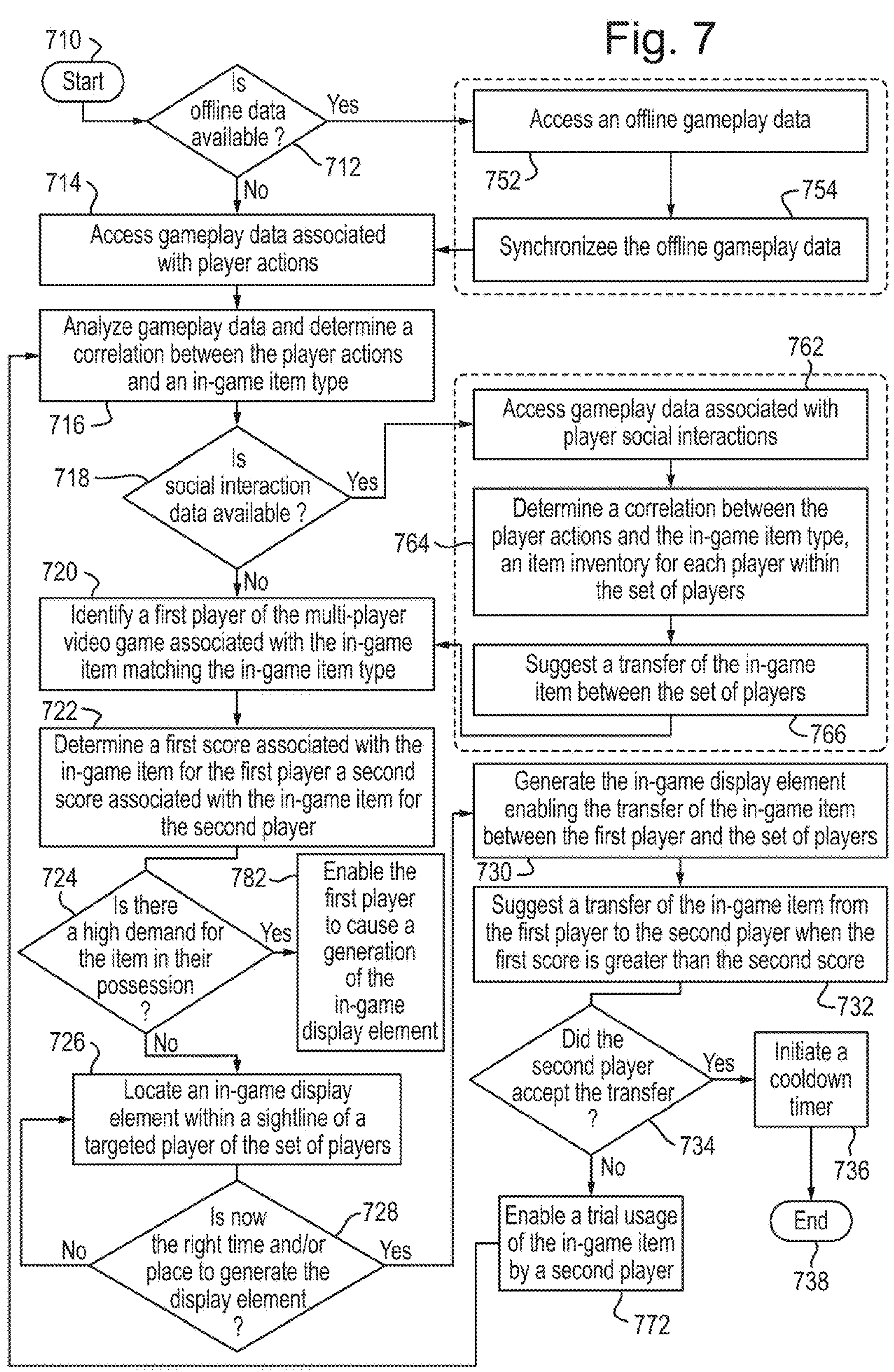
Fig. 7
710
Start
Is offline data available ?
712
Yes
No
Access an offline gameplay data
752
754
Synchronizee the offline gameplay data
714
Access gameplay data associated with player actions
Analyze gameplay data and determine a correlation between the player actions and an in-game item type
716
718
Is social interaction data available ?
Yes
No
762
Access gameplay data associated with player social interactions
764
Determine a correlation between the player actions and the in-game item type, an item inventory for each player within the set of players
Suggest a transfer of the in-game item between the set of players
766
720
Identify a first player of the multi-player video game associated with the in-game item matching the in-game item type
722
Determine a first score associated with the in-game item for the first player a second score associated with the in-game item for the second player
724
Is there a high demand for the item in their possession ?
Yes
No
782
Enable the first player to cause a generation of the in-game display element
726
Locate an in-game display element within a sightline of a targeted player of the set of players
Is now the right time and/or place to generate the display element ?
728
No
Yes
Generate the in-game display element enabling the transfer of the in-game item between the first player and the set of players
730
Suggest a transfer of the in-game item from the first player to the second player when the first score is greater than the second score
732
Did the second player accept the transfer ?
734
Yes
No
Initiate a cooldown timer
736
End
738
Enable a trial usage of the in-game item by a second player
772

METHODS AND SYSTEMS FOR GENERATING AN IN-GAME DISPLAY ELEMENT

BACKGROUND

The present disclosure pertains to methods and systems for suggesting in-game items to players within a video game environment. More particularly, but not exclusively, the disclosure relates to a method that collects and analyzes gameplay data and social interactions to suggest in-game items, thereby creating a targeted and efficient system for the exchange of in-game items.

SUMMARY

The trading of in-game items within multiplayer online games is a well-established practice. Players traditionally list their items on an in-game marketplace or directly advertise to other players their intent to trade specific items. However, these methods can often be inefficient, especially in games with large player bases. The in-game marketplace can become overwhelmed with commonly traded items, making it difficult for unique or beneficial items to stand out. Additionally, these methods do not take into account the specific needs or desires of individual players, leading to an impersonal and ineffective trading experience for players.

Existing in-game trading systems present multiple challenges that could be addressed to significantly enhance the user experience. In the ever-growing and complex world of online multiplayer games, there is an increasing demand for a more personalized and targeted in-game trading system. A system that is capable of identifying the specific needs or preferences of individual players could improve the interactive exchange experience for all participating parties.

The inefficiencies of the current trading systems suggest the necessity for a solution that considers the gameplay of one or more players and the social interaction between players to improve the operation of an in-game market place For example, the gaming characteristics and/or preferences of players participating in the in-game market place may be used to understand how and when the trading of an in-game item might be facilitated using the improved market place. This would generate an efficient method of item suggestion, where items in one player's inventory are identified as potentially beneficial to another player, and thus suggested to them. The identification and suggestion, e.g., in an automated manner, of items helps to increase the efficiency of a system configured for trading items in the in-game marketplace.

It is important that such a system does not disrupt the gaming experience but rather seamlessly integrates within it, maintaining the gameplay immersion. Thus, there is a distinct need for a system that leverages gameplay data and/or social interactions to facilitate the efficient trading of in-game items (i.e., allocation of in-game resource), e.g., based on personalized, targeted item suggestions, ensuring that these suggestions are presented in an immersive, non-disruptive manner during player engagement in the video game.

Systems and methods are provided herein for facilitating an in-game item transfer in a multi-player video game. This is achieved by accessing gameplay data associated with player actions of a set of players in a multi-player video game. In some examples, the set of players may contain at least one player, e.g., of a certain player type and/or player category. The in-game data is analyzed to determine a correlation between the player actions and an in-game item type. The type of in-game item be defined by a category of in-game items exhibiting one or more defining characteristics or properties. A first player of the multi-player video game is identified, the first player being associated with the in-game item belonging to the in-game item type, and generating, using control circuitry, an in-game display element facilitating the transfer of the in-game item between the first player and the set of players. As such, player engagement may be maintained by the transfer, e.g., automatic transfer or allocation or resource, of an in-game item between players. For example, a transfer of an in-game item may be made based on predicting or suggesting to one player usage of an in-game item that is associated with another player.

In some examples, methods and systems may comprise accessing the gameplay data associated with player social interactions of the set of players in the multi-player video game, determining, based on the gameplay data associated with the player social interactions and the correlation between the player actions and the in-game item type, an item inventory for each player within the set of players, and suggesting a transfer of the in-game item between the set of players according to the item inventory.

In some examples, methods and systems may comprise accessing offline gameplay data associated with the player actions of the set of players in the multi-player video game during a period of offline gameplay, and synchronizing the offline gameplay data with the gameplay data upon re-establishment of an online connection.

In some examples, methods and systems may comprise accessing records of item transfers between players participating in a local multi-player video game during the period of offline gameplay.

In some examples, methods and systems may comprise facilitating a trial usage of the in-game item by a second player from the set of players, wherein the trial usage does not affect a possession status of the in-game item by the first player.

In some examples, methods and systems may comprises determining a first score associated with the in-game item based on the player actions of the first player, determining a second score associated with the in-game item based on the player actions of a second player, and suggesting a transfer of the in-game item from the first player to the second player when the first score is greater than the second score.

In some examples, methods and systems may comprise locating the in-game display element within a sightline (e.g., within a field of view) of a targeted player of the set of players within the multi-player video game.

In some examples, methods and systems may comprise presenting for display the in-game display element based on a trigger condition, wherein the trigger condition is a gameplay event within the multi-player video game.

In some examples, methods and systems may comprise initiating a timer associated with the in-game item, wherein the timer defines a period during which a subsequent transfer of the in-game item is restricted.

In some examples, methods and systems may comprise generating a notification to the first player when the gameplay data indicates a high demand for the in-game item in their possession and, in response to receiving the notification, facilitating the first player to cause a generation of the in-game display element. Such player engagement may be maintained by the efficient, e.g., automatic, transfer of an in-game item based on predicting or suggesting to one player usage of an in-game item that is associated with another player.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which:

FIG. 7 presents a detailed flowchart depicting a comprehensive process for facilitating in-game item transfers, according to some examples of the disclosure.

DETAILED DESCRIPTION

Figure 1A:
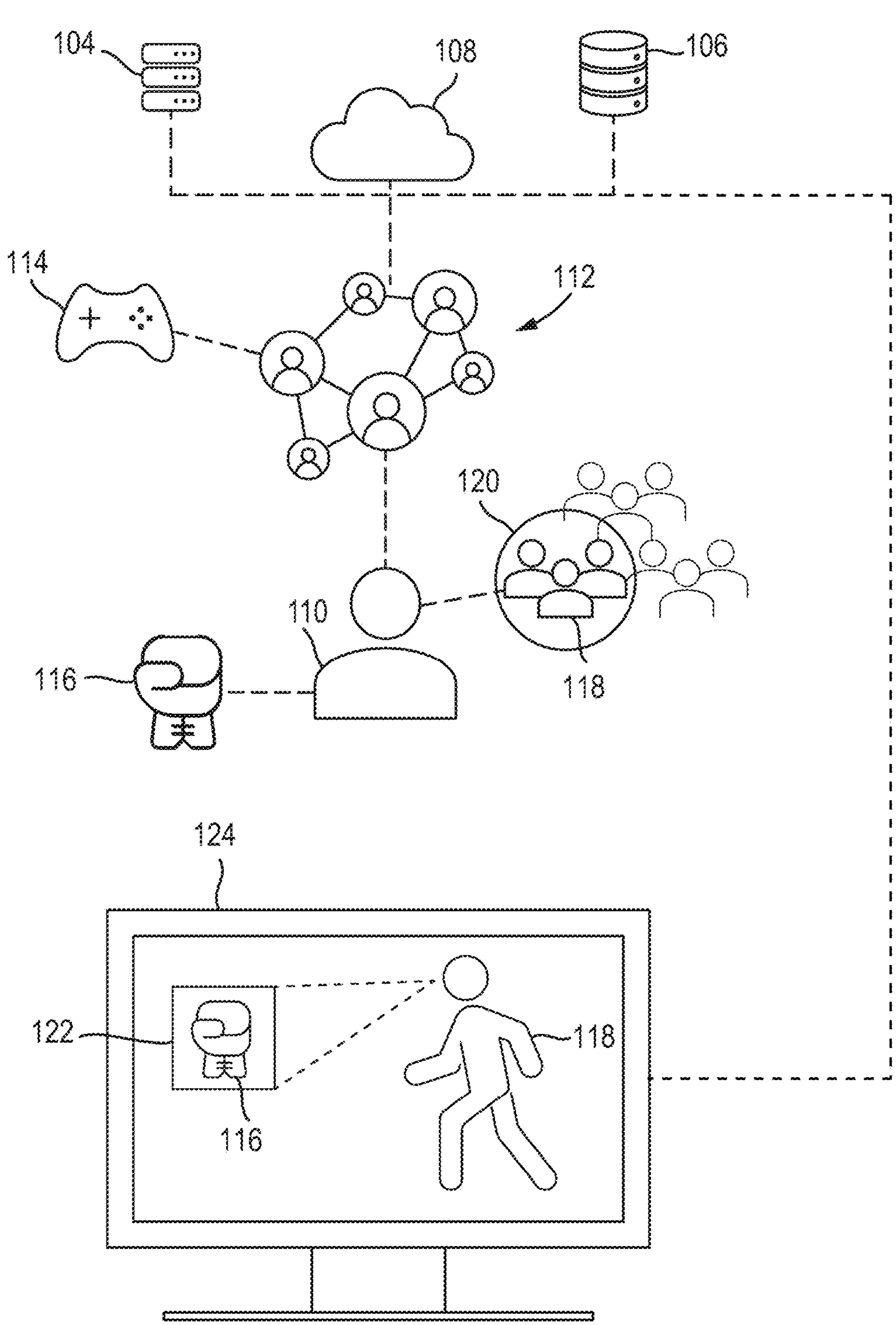
FIG. 1A illustrates a high-level overview of a system for facilitating in-game item transfers, in accordance with some examples of the disclosure.

FIG. 1A provides a broad overview of a system for item suggestion in a virtual environment, such as a video game, encompassing various gaming environments. This methodology disclosed herein is flexible and can be adapted to various types of systems, e.g., genres of video games, such as immersive role-playing games, competitive strategy-based games, or massively multiplayer online (MMO) games. The systems and methods are not restricted to any specific game type or platform. For example, the disclosure refers generally to the term "in-game item" and "in-game item type", but for the avoidance of doubt, the disclosure is envisaged to extend to any appropriate type of virtual environment, e.g., an extended reality (XR) environment, having functionality to exchange items between users of the virtual environment. The below examples use the scenario of players interacting in a gaming environment.

The system components may include a server 104, a database 106 and a network 108. These components form an architecture that may facilitate implementation of a method of item suggestion in a virtual environment. The server 104 may be designed to communicate with multiple client devices over the network 108, which may be a global infrastructure like the internet or a more localized network such as a Local Area Network (LAN).

The server 104 may interface with the database 106. The database 106 may serve as a reservoir of information, e.g., holding data sets related to user actions in the virtual environment, such as gameplay and interactions with other players. It may store metrics such as player performance statistics, item usage patterns, and details about player social interactions. These data sets may provide the information from which item suggestions can be derived.

In the system shown in FIG. 1A, control circuitry, e.g., control circuitry of server 104, may access, from the database 106, gameplay data associated with one or more player actions, e.g., one or more user inputs at a user interface 114 (and/or gameplay actions caused by one or more user inputs), of a set of players 112. This gameplay data may form the basis of the system's analytical processes. By using computational resources of the server 104 and the associated control circuitry, the system may analyze this data to determine a correlation between player actions and an in-game item type, such as an in-game resource used by a player in the game. For example, a correlation may be determined between an in-game item type, e.g., a usable asset in a virtual gaming environment, and player performance in a level or area of the virtual gaming environment. In some example, a positive correlation is determined based on a higher level of player performance, and a negative correlation is determined based on a lower level of player performance. The nature of this correlation may be influenced by a variety of factors, which may range from gameplay strategies and in-game item preferences to the nuances of the player's social interactions within the game. Further detail on determining the correlation is given below in relation to FIGS. 3 and 7.

Based on, or in response to, the analysis, the system, e.g., control circuitry of server 104, may identify a first player 110 associated with an in-game item matching the identified in-game item type, e.g., the game item may belong to a category or type of in-game items. For example, the system may search for one or more players having, in a player inventory, an in-game item indexed under the in-game item type. For example, a player action may relate to progression through a level in a game, and an in-game item type may relate to an asset used to assist the player progression through the level. For example, the in-game item type may be a tool, weapon, access token, credits (e.g., gaming credits or currency), tutorial, avatar skin (e.g., appearance), or any other appropriate type of in-game item that a player may use to aid progression in the level of the game. In the example shown in FIG. 1A, the in-game item is a boxing glove 116 (e.g., of the item type "player resource"), usage of which positively correlates with player progression in the game. In some examples, an in-game item may be any appropriate item associated with a game (e.g., music, wallpapers, soundtracks, video content of for display in a game, etc.). For example, an in-game item might be a skin that can be applied to a menu system of a game, and/or to a character's "home" in the game. Such a skin may be desirable in the gaming environment, as it might relate to or mimic the style of one or more trending topics. Additionally or alternatively, an in-game item might be a reward video that is issued upon completion of a level. Such a reward video may be desirable in the gaming environment, as it might provide an indication relating to progression in the game. Additionally or alternatively, the in-game item might be an "easter egg", or at least information relating to discovery of an easter egg, in the game.

In the example shown in FIG. 1A, the system, e.g., control circuitry of server 104, identifies another player 118 from the set of players 112 having similar gameplay data as player 110. In the example shown in FIG. 1A, player 118 belongs to a social circle 120 shared with player 110. For example, control circuitry may access the gameplay data associated with player social interactions of the set of players 112 to determine a social connection between player 110 and player 118. For example, player 110 and player 118 may be connected via one or more social connections, e.g., friends, family, colleagues, gaming preferences, gaming progression, location, etc. In some examples, the players may be connected by virtue of having interacted in the past, e.g., by having participated in the same group content or by having traded items directly, or having cleared challenging content together. For example, control circuitry may identify player 118 based on a correlation, e.g., a similarity, between the gameplay data of player 110 and the gameplay data of player 118. In some examples, control circuitry may limit a search to identify another player to social circle 120.

The system, e.g., control circuitry of server 104, generates an in-game display element 122, as represented in gaming display 124. For the avoidance of doubt, gaming display 124 may be any appropriate type of display, e.g., a display screen or an extended reality environment displayed by an XR device, such as a head-mounted display or a contact lens. Display element 122 may facilitate/enable the transfer of the correlated in-game item 116 from the first player 110 to player 118. For example, the transfer may be a paid transfer of item 116 from an inventory of player 110 to an inventory of player 118, e.g., upon agreement between the two players. In some examples, control circuitry, e.g., control circuitry of server 104, may provide for automatic transfer of item 116, e.g., based on one or more game rules, user settings and/or user preferences. For example, an automatic transfer of item 116 may be based on a predetermined pricing structure, implemented by server 104 and agreed by users 110 and 118.

In the example shown in FIG. 1A, the generation of the in-game display element 122 occurs so as to suggest an item for transfer in a manner that is easily accessible to player 118 and fits seamlessly into the game's environment. for example, the in-game display element 122 may be placed within a sightline or field of view of player 118 in the gaming environment. In some examples, in-game display element 122 may present an interactive interface featuring the suggested in-game item 116, contributing to an immersive and dynamic gaming experience for the players.

Figure 1B:
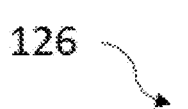
FIG. 1B shows a character's home environment within a larger online gaming environment, in accordance with some examples of the disclosure.
Figure 1B:
Figure 1C:
FIG. 1C shows the character's home environment having an information element displayed to the player, in accordance with some examples of the disclosure.
Figure 1C:
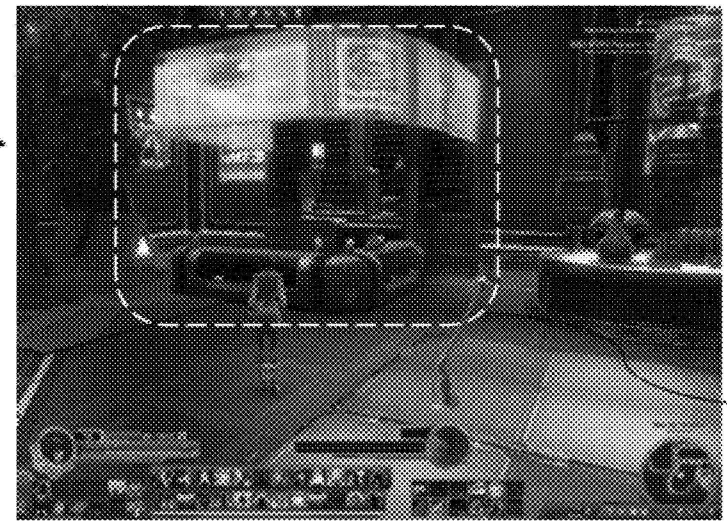
Figure 1D:
FIG. 1D shows a generated in-game display element, in accordance with some examples of the disclosure.
Figure 1D:

FIGS. 1B-1D shows another example of generating an in-game display element, such as an advertisement in the gaming environment. For example, advertisement types may include a representation of the in-game item to transfer (or sell), the representation being personalized to the potential recipient (or buyer). For example, if a seller is advertising the sale of an outfit, the advertisement shown to a potential buyer may include an animated picture of one of the buyer's characters or avatars wearing the outfit. The character to depict may be chosen as the current character the targeted buyer is playing when the ad is shown, or another character of the targeted buyer based on which character may benefit the most from the item being advertised and/or how popular that other character is for that player. Such an advertisement may include an audio track, either chosen by the seller amongst several offered by the game, recorded by the seller, or selected based on the buyer's data or preferences. The location where the advertisement may be shown in the gaming environment may be within public or private virtual spaces. In the case of a private space, the personalized advertisement may be shown continuously, or for predetermined periods. In some examples, an existing in-game elements may be dedicated or repurposed to show the advertisement.

FIG. 1B shows a character's home environment 126 within a larger online gaming environment, and FIG. 1C shows the character's home environment 126 having an information element 128 displayed to the player, e.g., displaying one or more general pieces of information about the gaming environment, e.g., time, number of players, score, message, etc. In the example shown in FIG. 1B, control circuitry determines an appropriate location at which to generate for display the information element 128, e.g., in a space not occupied by an existing display element, or overlaying an existing display element.

In FIG. 1D, control circuitry generates in-game display element 130 for display in information element 128. For example, control circuitry may generate an advertisement, for display to user 118, for an in-game item belonging to user 110. In some examples, the manner in which the in-game display element 130 is displayed may depend on various factors, such as an advertising subscription tier to which user 110 and/or 118 belong. While the example shown in FIGS. 1B-1D relate to displaying an in-game display element (e.g., an advertisement) in a character's home environment within a gaming environment (or on a home screen of a user device), it is to be understood that the present disclosure extends to the generating in-game display elements in a public environment, e.g., a common virtual space inside a gaming environment. For example, control circuitry, e.g., control circuitry of server 104, may detect an existing display element, e.g., a virtual billboard or dedicated advertising space, that is in view of a targeted viewer's character and adapt the existing display element accordingly, e.g., to display the in-game display element (e.g., an advertisement) on the existing display element (e.g., in a manner similar to how 130 is displayed on 128). In some examples, when a character is seeing only part of the existing display element, an advertisement displayed on that existing display element may be adapted so that the targeted viewer sees enough information to understand that they are being offered transfer of an in-game item. For example, the advertisement may reorient to a vertical display if the target viewer sees only half of the existing display element. If control circuitry detects that the existing display element is in more than one player's characters field of view, control circuitry may decide to show advertisement personalized to only one player based on metrics relevant to this player and their propensity to trade at that particular moment. The control circuitry may elect to show multiple personalized advertisements in sequence based on the proximity of the various targeted potential buyers. Additionally, or alternatively, where multiple users are viewing a public environment on separate respective user devices, control circuitry may elect to simultaneously display multiple advertisements that are each adapted in a manner to suit the respective users.

Figure 2:
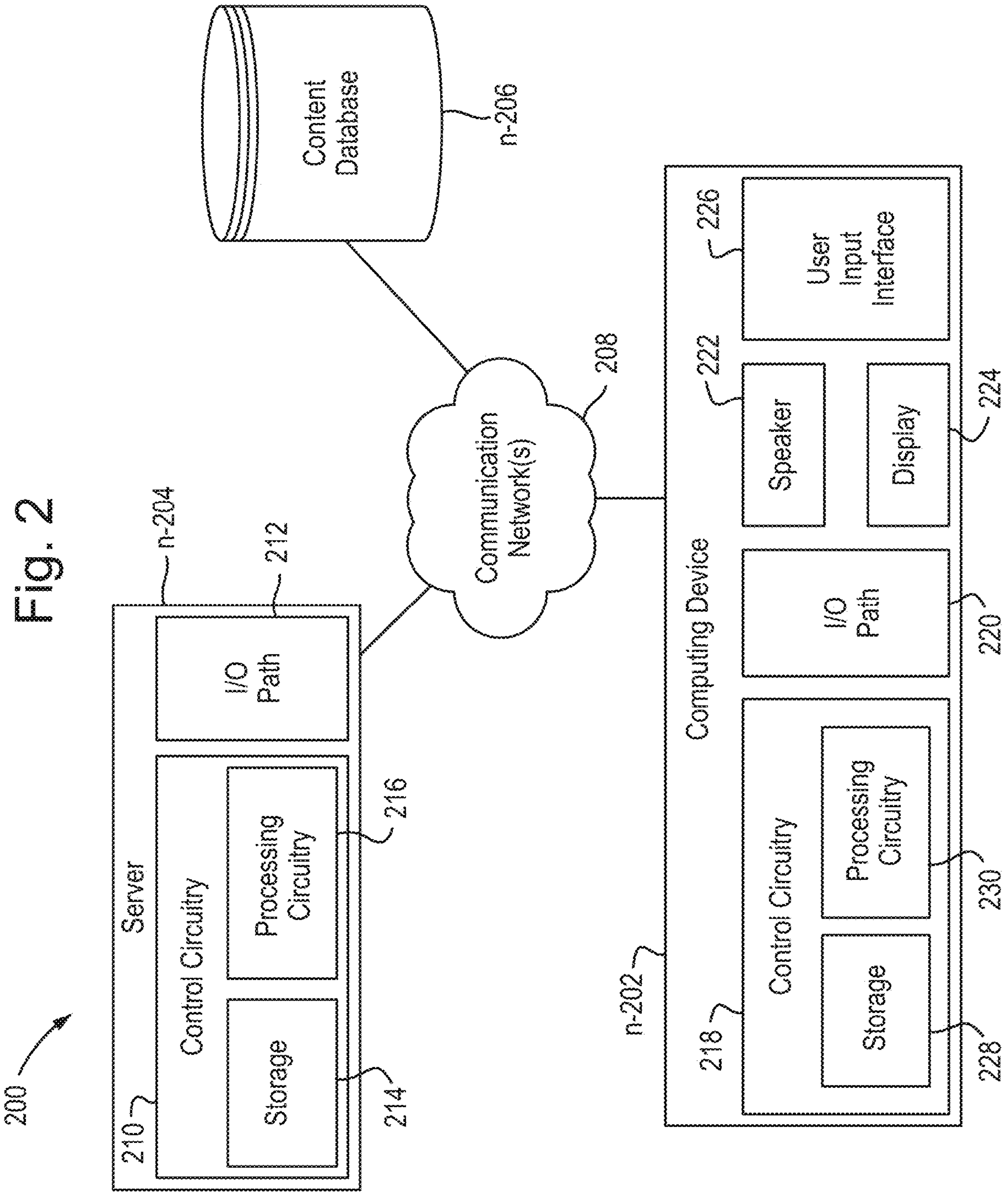
FIG. 2 presents a block diagram showing the various components of an exemplary system designed for analyzing gameplay data, identifying players associated with specific in-game item types, and generating display elements to facilitate item transfers, in accordance with some examples of the disclosure.

FIG. 2 is an illustrative block diagram showing the exemplary system 200, i.e., a non-transitory computer-readable medium, which is designed to execute algorithms and interact with user interfaces based on the structured components. The depiction of system 200 includes a collection of components, but it should be understood that in some embodiments, any number of these components can be combined or integrated into a single device. System 200 comprises computation unit n-202, server n-204, and data storage n-206, each of which is connected to the communication network 208, which could be the Internet or any other suitable network.

System 200 integrates computation unit n-202, representing any applicable number of computing devices, with server n-204, depicting any suitable number of servers. The data storage n-206 represents any appropriate number of data storage systems. Each of these components is in communication with one another via the communication network 208, which can include various types of networks or combinations of networks.

Server n-204 includes control circuitry 210 and input/output (hereinafter "I/O") path 212. Control circuitry 210 comprises storage 214 and processing circuitry 216. The computation unit n-202, which may be a personal computer, a laptop, a tablet, a smartphone, or any other type of computing device, comprises control circuitry 218, I/O path 220, speaker 222, display 224, and user input interface 226.

Control circuitry 218 consists of storage 228 and processing circuitry 230. Control circuitry 210 and/or 218 could be based on any suitable processing circuitry such as processing circuitry 216 and/or 230, which might involve one or more microprocessors, microcontrollers, digital signal processors, programmable logic devices, field-programmable gate arrays (FPGAs), application-specific integrated circuits (ASICs), or a multi-core processor.

Each of storage 214, 228, and/or storages of other components of system 200 can be an electronic storage device that stores electronic data, computer software, or firmware. Storage devices might include random-access memory, read-only memory, hard drives, optical drives, or any other suitable fixed or removable storage devices.

Control circuitry 210 and/or 218 executes instructions for a software application stored in memory (e.g., storage 214 and/or 228). Specifically, the application instructs control circuitry 210 and/or 218 to perform functions discussed herein. Any action performed by control circuitry 210 and/or 218 may be based on instructions received from the application.

Computation unit n-202 may send instructions to control circuitry 210 and/or 218 using user input interface 226. User input interface 226 could be any suitable user interface, such as a keyboard, touchscreen, voice recognition interface, or other user input interfaces.

Server n-204 and computation unit n-202 can transmit and receive content and data via I/O path 212 and 220, respectively. For instance, I/O path 212 and/or I/O path 220 may include a communication port(s) configured to transmit and/or receive data or content via communication network 208.

FIG. 3 to FIG. 7 represent detailed processes and features, which can be implemented in whole or in part, on system 200, or any other appropriately configured system architecture. The term "control circuitry" as used in this description refers broadly to the control circuitry described above for FIG. 2. For example, the control circuitry may comprise the control circuitry of the computation unit n-202, control circuitry of server n-204, or a combination thereof.

Figure 3:
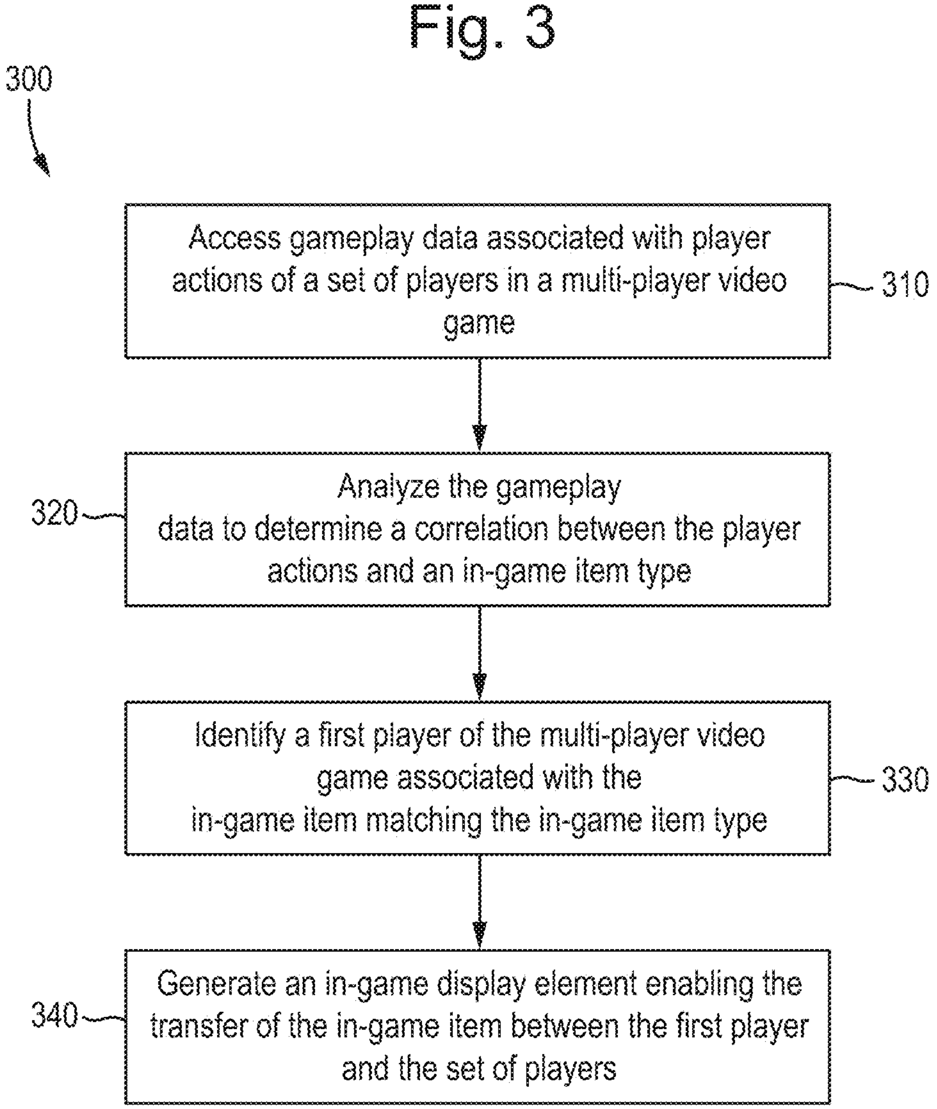
FIG. 3 presents a flowchart depicting a method according to some examples of the disclosure.

FIG. 3 illustrates a process 300 for generating in-game display elements for facilitating in-game item transfers, according to some examples of the disclosure. In some examples, at 310 the system accesses gameplay data associated with player actions of a set of players in a multi-player video game. In some examples gameplay data may comprise a player's interactions and/or usage patterns of in-game items. This data may be accessed in numerous ways. In some examples, it may be sourced directly from the player's activities within the game, such as the selection, application, and effect of items during game challenges or encounters. The data might also include a player's item-related interactions with other players, such as item trades, shared item strategies, or joint use of items in multiplayer quests. In another example, the gameplay data may be collected from external platforms, like a player's social media posts discussing item tactics or in-game reviews commenting on item functionality. If other players are identified who face similar game scenarios, the data may lead to the conclusion that the same item could prove beneficial to them, in the same manner as it was for the original player.

Step 320 involves analyzing the gameplay data to determine a correlation between the player actions and an in-game item type. This analysis may utilize various techniques, such as data mining, machine learning, or predictive analytics. The correlation be determined based on on various factors, like shared gaming behaviors, favored gaming techniques, or overlapping in-game social circles. In some examples, this correlation may be inferred from past engagements with specific in-game items or shared character features. For example, a correlation may be determined based on one or more player actions matching (or correlating with) one or more properties of an in-game item. For example, a player action may relate to the completion of a level in the game, wherein the completion of the level was helped or enable by the use of an in-game item belonging to a type or category of in-game items. In this manner, a correlation (e.g., a correlating factor or a coefficient of correlation) may be established between a player action and an in-game item, e.g., defining a statistical relationship between the player action and the in-game item.

In some examples, shared gaming behaviors may indicate a common preference for gameplay mechanics or strategies. Players who frequently engage in the same type of quests or who use similar tactics in combat may be grouped together.

In some examples, favored gaming techniques may be another correlating factor. If the first player uses an item to increase stealth for a strategic advantage, other players who similarly value stealth-based gameplay might also find this item beneficial.

In other examples, in-game social circles may also play a part in correlation between the player actions and an in-game item type. Players who interact frequently with the first player might share common interests or preferences, potentially reflecting their use of in-game items.

Moreover, past interactions with specific in-game items may provide valuable insight into future behavior. If the first player and other players have previously used a particular item to overcome a specific challenge, they might be more inclined to use that item again when faced with a similar challenge.

As an example, a player may use a magical amulet to shield their character during difficult battles. The system may identify other players who also engage in challenging fights but struggle due to a lack of adequate defense. By recognizing the correlation between the first player and players struggling in similar combat situations, a preference for challenging gameplay, and the need for enhanced defense, the system may recommend the magical amulet to this subset of players, identifying they might also find it beneficial. In some examples, a positive correlation (e.g., a first correlation coefficient) may be found between a player's success in a particular gaming challenge and the use of an in-game item in that challenge. In a similar manner, a negative (or less positive) correlation (e.g., a second) correlation coefficient) may be found between a player's failure in a particular gaming challenge and not using an in-game item in that challenge. Thus, control circuitry may be configured to compare the first correlation coefficient and the second correlation coefficient to establish that a particular in-game item is useful when attempting a particular challenge.

In some examples, data mining may be used to search for patterns or associations between different data points. Suppose the data shows that a first player consistently uses a specific item in a particular game scenario. In that case, data mining may help identify other players who demonstrate a similar pattern in their gameplay, thereby suggesting a shared gameplay style.

In other examples, machine learning algorithms may be employed to discover relationships or patterns that may not be immediately obvious. For instance, if the first player often uses a particular item when playing at a certain time of day, a machine learning algorithm might predict that other players who also play at that time might benefit from using that item as well.

Predictive analytics may further assist in establishing a correlation. For instance, a predictive model may be built using the first player's gaming behavior as the input variable and the usage of the in-game item as the output variable. This model may then predict, based on similar inputs from other players, who is likely to find the same in-game item useful.

An in-game item type denotes a classification of virtual assets that exist within the gameplay environment of a multi-player video game. The defining characteristics of these item types can be varied and numerous, depending on a number of factors.

In some examples, an item type may be determined based on its functionality. For example, items may be categorized into different types such as weapons, armor, healing items, magic items, tools, transportation means, crafting materials, or quest-specific items, each with its unique role and purpose within the gameplay.

In some examples an item type may be determined based on its specific attributes. This may include unique traits or powers they possess or confer, such as offensive, defensive, speed-enhancing, or invisibility granting capabilities, among others.

The rarity of the items may also serve as a distinctive factor in their categorization. Terms such as common, rare, epic, or legendary are often used to indicate the degree of rarity, thereby suggesting the power, uniqueness, and desirability of these items within the game.

The origin or method of acquisition of the items may further define their types. This may include classifications based on whether items are loot drops from enemies, purchases from in-game or out-of-game stores, rewards from quests, or creations through in-game crafting mechanics.

In some examples, items may be grouped into types according to their usage within specific game scenarios, challenges, or even player classes. This means that certain item types might be more suitable or available to certain types of players or in certain situations within the game.

In some examples, the visual aesthetics of an in-game item may also define its type. This may be based on the color, shape, size, texture, or any other visual characteristic that contributes to the item's overall look and style, making it unique or desirable to the players.

Step 330 identifies a first player of the multi-player video game associated with the in-game item matching the in-game item type. The in-game item associated to the first player falls under the category of the in-game item type that has been identified through the previous analysis. This item may range from player's equipment, a distinctive game relic, or a tailor-made avatar adornment. For instance, one type of item might be the player's weaponry used for combat, the armor used for protection, or the tools used for interaction with the environment. Certain players may favor specific equipment due to its efficiency, aesthetics, or rarity. For example, a player may regularly use a specific sword that offers a unique combination of speed and damage. This choice of equipment may give valuable insights into the player's style, preferences, and strategies.

A distinctive game relic is another type of in-game item that might be associated with the player. These are typically unique or rare items that a player might acquire through complex quests, high skill levels, or significant in-game events. These relics often bestow special abilities or unlock unique aspects of the game. For instance, a player might be in possession of an amulet that provides increased magical powers.

In some examples, avatar adornments, which are typically personal and visual elements that a player might associate with, may include a range of items such as clothing, hairstyles, or other forms of customization that allow players to express their individuality or status within the game world. For instance, a player might have a custom-designed helmet featuring a unique emblem signifying their membership in a particular gaming guild.

The identifying process might consider the player's item usage patterns, its significance in their gameplay tactics, or even an emotional connection stemming from in-game accomplishments or landmarks. In some examples of the disclosure, the system might consider the scarcity or worth of the item in the game's economy or the item's possible usefulness for other players.

In some examples, gameplay data may be accessed and analyzed to discern patterns or behaviors that connect the first player with the specific in-game item type. This could be demonstrated through the consistent utilization of the item by the first player, their demonstrated efficiency with the item, or the item's contribution to significant in-game achievements or milestones. For example, the first player might regularly engage with a sword that falls under the item type of weaponry, signifying a possible affinity for combat-oriented gameplay. This pattern of engagement can be quantified through factors such as frequency of use, performance enhancements due to the item, or correlation with successful game outcomes.

Additionally, the first player's in-game interactions or social relationships may also be considered. Players often form in-game alliances or rivalries, trade items, or participate in common quests or events. These interactions could reveal more about the player's affinity for certain item types.

At step 340 an in-game display element facilitating the transfer of the in-game item between the first player and the set of players may be generated. The in-game display element may take many forms. For instance, in a contemporary game setting, it might manifest as an interactive video kiosk or an immersive digital display. In a historical or medieval context, it may take on a more analog form, such as a parchment on a tree or a heraldic banner. In a magical or fantastical setup, the display element may be an apparition or magical projection. In less immersive implementations, the in-game display element may be represented as a more traditional game interface element, such as a dialog box, a notification, an interactive icon, or a designated menu within the game's user interface. In some examples, the in-game display element may be designed to present the item transfer opportunity to the players in an informative and engaging manner, effectively integrating with the overall aesthetic and user experience of the game.

Upon the activation of this display element, the players might view details about the item, its origins, its associated player, its potential utility, and other relevant information. They might have the option to accept or reject the item transfer, and their choices could be recorded and utilized in further enhancing the accuracy and relevance of future correlations and item transfer suggestions.

In some examples, the in-game display element may also provide additional options or functionalities, such as facilitating a trade negotiation or allowing players to request additional information. It could also offer social interaction features, like the ability to send messages or feedback related to the proposed item transfer.

In some examples, in-game display element may be displayed in such a way as to integrate within the gaming landscape, maintaining an effective blend of visibility and non-disruptive gameplay immersion. The element may be contextually adjusted or updated to align with the game's aesthetic and narrative style. For instance, in a fantasy-themed game, the item may be displayed within a chest, while in a sci-fi setting, it might appear on a cutting-edge technology panel.

In some examples, the in-game display element may be integrated within pre-existing game user interface (UI) elements, such as in-game screen, panels, or map interfaces. In another example, a dedicated in-game display UI element may be generated and positioned in a way that it doesn't impede the main gameplay view.

In some examples, the system may take into consideration the timing of generating and displaying the in-game display element during gameplay. Here, the systems and methods may recognize periods of lower gameplay intensity, scheduling the display so as not to interfere with critical gameplay moments. For example, the system might determine that the most opportune time to display the in-game display element is when the player is in a game-designated safe zone or upon a beginning or completion of a specific quest.

Further, the methods and systems may provide the option for the in-game display element to be interactive. Upon interaction, such as clicking or hovering over the suggestion, additional context about the item could be revealed. This may include, but is not limited to, the item's potential benefits, the first player's utilization pattern, or its popularity among similar players. One such example of an interactive feature may be a 'try-on' or 'preview' option, allowing players to visualize how the item shown by the in-game display element would look or perform when equipped by their in-game character.

In some examples, the systems and methods may allow adjustable settings for the in-game display element. Players may modify the frequency, visibility, and nature of the display to suit their preferences. As an iterative process, the method may be configured to learn from these adjustments, refining the generation process over time to better align with player satisfaction and engagement.

In some examples, the process may also integrate feedback from the identified subset of players, allowing for ongoing improvements to the generation process based on user interaction and contentment.

Figure 4:
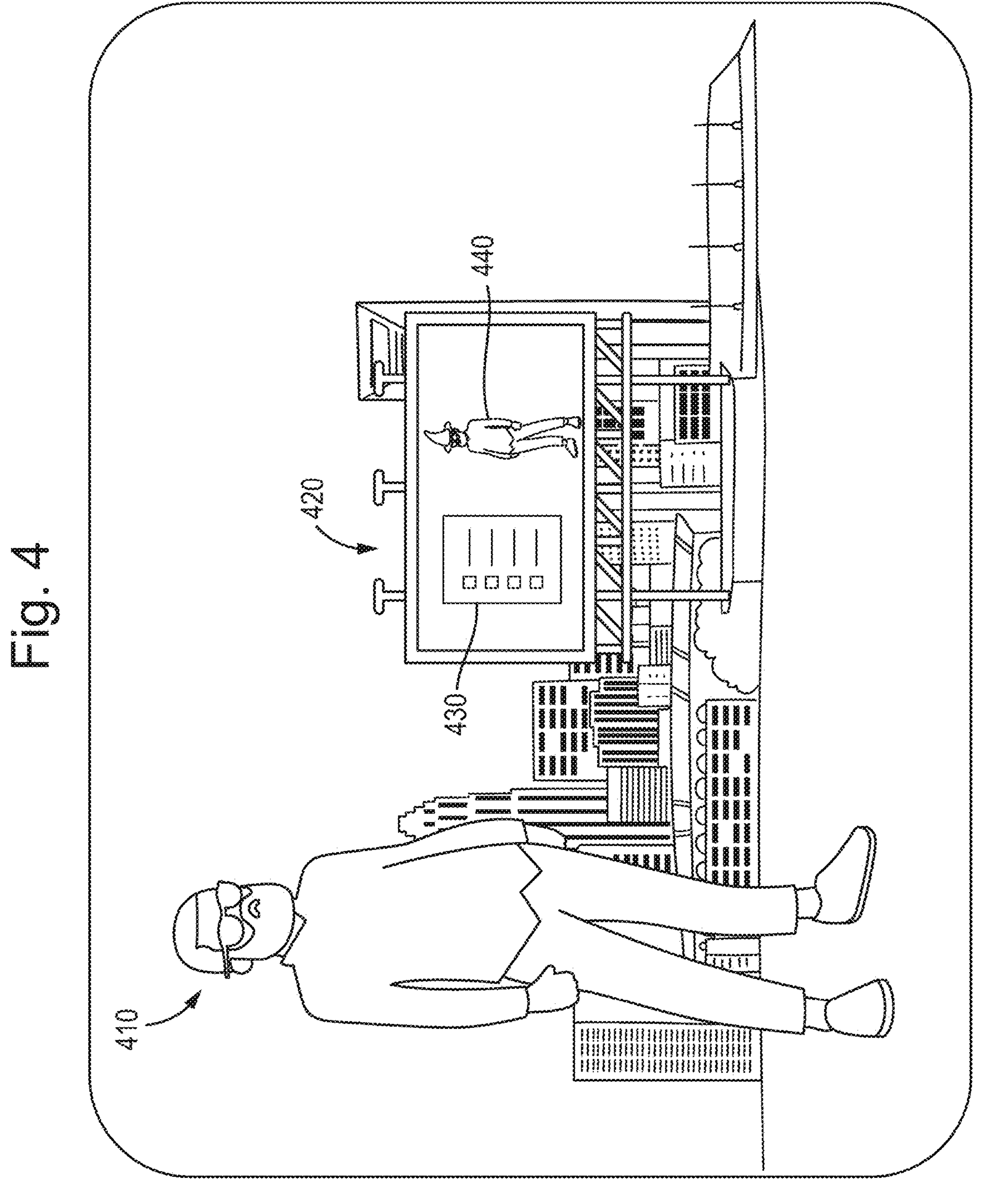
FIG. 4 depicts an example gameplay scenario involving a second player from a set of players in a multi-player video game.

FIG. 4 shows an example gameplay scenario involving a second player from a set of players in a multi-player video game. The figure showcases the in-game avatar 410 associated with the second player and an in-game display element 420 showcasing an in-game item 440 which was identified from a first player's inventory.

The in-game avatar of the second player is graphically represented within the gameplay environment on an in-game display element. The in-game display element is strategically positioned within the game world to ensure clear visibility to the second player during gameplay.

In some examples, the positioning of the in-game display element is dynamically managed within the virtual game world so that its prominence and visibility to the second player is maintained during gameplay. Such positioning may be determined based on the player's in-game location, the avatar's orientation, the specific in-game event or quest the player is engaged in, or any other factors contributing to player engagement with the display element. In some examples, system control circuitry may employ an algorithm or a set of rules defining the ideal placement of the display element, which may be dynamically adjusted based on the game's ongoing events and the player's actions.

Consider, for example, a multiplayer video game where players engage in combat quests. In FIG. 4, a second player, represented by an avatar 410 (Avatar 2), is participating in the game. As Avatar 2 navigates through the game world, an in-game display element 420 appears within Avatar 2's field of view. This display element presents a visual representation of the avatar equipped with a special combat item 440, a magical hat, an in-game item currently held by another player. The image of the avatar equipped with the hat is coupled with statistical information 430 such as the hat's powers, special abilities, and how it may potentially increase the avatar's combat prowess.

The positioning of the display element is carefully calculated using the control circuitry. If the avatar is currently in a safe zone, the element may appear centrally to capture Avatar 2's full attention. However, if the Avatar 2 is in the midst of combat, the element may be placed at a corner of the screen to avoid disrupting the gameplay.

Avatar 2 may have the option to interact with the display element 420. For instance, they might select the hat for a closer look, compare it with their current equipment, or initiate a request to trade for the hat.

In some examples, Avatar 2 may be shown with the in-game item equipped. Specifically, the in-game display element may depict the avatar equipped with the in-game item. This visual representation is not limited to the appearance of the avatar itself, but can optionally extend to illustrate the potential functional changes in the avatar's abilities, characteristics, or status within the game world resulting from the use of the item. Such functional changes may include, but are not limited to, enhancements in the avatar's strength, speed, magical powers, or other in-game attributes, each of which may be graphically symbolized or indicated in conjunction with the visual representation of the avatar.

Moreover, the in-game display element also includes various statistics 430 associated with the in-game item. These may include, but are not limited to, its impact on the avatar's attributes, its rarity, its usage history, or any other pertinent information that might influence the player's decision to acquire it. This structured presentation of information may support the player in making an informed decision regarding the in-game item.

In some examples, the second player may also interact with the element. They might, for example, inspect the item in more detail, compare it with their current equipment, or initiate a trade/transfer for the item. If the second player identifies the in-game item as beneficial, they may initiate a procedure to acquire or trade the item. This may take place through an interactive interface of the in-game display element. In some examples, players within a multi-player game environment may be given a capability to initiate the generation or placement of in-game displays for items they desire to trade or share. To facilitate this, the game might present a curated list of potential in-game display element opportunities. Such listings may provide an array of options, from selecting the profiles of targeted players to choosing the type and location of the display elements. Beyond the visual components, these in-game display elements may be augmented with an auditory dimension. Players may be offered a selection of audio tracks, or even given the freedom to embed their own voice recordings. In virtual settings that mimic public arenas, the game's underlying system might employ advanced detection algorithms to discern whether the in-game display element is within the direct line of sight of the targeted buyer's character. If, for instance, a character is positioned such that only a portion of the display is visible, the system may dynamically adjust the display. In some examples, the game identifies that an in-game display element is within the visible field-of-view of multiple players simultaneously, and may employ a strategic approach to presentation. For instance, the game may draw from various metrics, such as a player's recent trading history or current in-game status, the game may prioritize which player receives a personalized display. In some examples, based on players' proximities or other in-game dynamics, the system might sequence multiple personalized displays, ensuring each targeted player gets a tailored trade proposition. In some examples the game might cap the number of active in-game display elements in both private and public virtual instances. Should there be an influx of display requests, the game may employ a queuing system, ensuring each request is addressed in turn as space becomes available. In situations where preferred or optimized display locations lack sufficient display elements, the game might possess the capability to dynamically create new ones. This ensures widespread coverage and offers players flexibility in their display placements. In some examples, the game may introduce hierarchies in player account classes, especially in models differentiating between paid subscribers and free-to-play participants. In such scenarios, the game might reserve the ability to display trade items exclusively for certain premium tiers, thereby incentivizing players to upgrade for enhanced trading features. For example, in a massively multiplayer online game, if Player A wishes to trade a rare artifact, they may opt to secure a prime display spot within the game's central marketplace. This move, much like renting advertising space in the real world, may boost the visibility of their trade offer, drawing in potential interested parties.

In some examples, a transfer of the in-game item may involve exchanging in-game currency, trading other in-game items, or fulfilling specific game-defined objectives or tasks. The trade/transfer initiation might be subjected to approval from the first player or be automated, based on the in-game rules or settings. In some examples, the transfer may involve an exchange of in-game currency. The in-game currency may be any form of virtual currency used within the video game environment, such as coins, gold, gems, credits, or any other form of value representation. This in-game currency may be earned by players through their performance in the game, or, in some instances, may be purchased with real-world money. In some examples, the system might also allow for the use of real-world currency for the transaction of the in-game item. This may be facilitated through in-game purchases, wherein players use real money to buy in-game currency or items directly. The real-world currency may be processed through various payment platforms integrated with the gaming system. These may include credit or debit cards, digital wallets, direct bank transfers, or any other acceptable payment systems. In some examples, the transfer may be executed through a trade of other in-game items. The players may, for example, negotiate an agreement where the in-game item is exchanged for one or more other items from the inventory of the player acquiring the item. The items involved in the trade could be of equal, lesser, or greater value, depending on the specifics of the trade agreement and the perceived value of the items to the players involved. Moreover, the transfer may also be dependent on the completion of specific game-defined objectives or tasks. These may include completing a specific mission, achieving a particular score, reaching a certain level, or any other in-game achievement. The tasks or objectives may be predefined by the game or may be custom defined by the players involved in the transaction. The initiation of the trade or transfer may also vary in different implementations. In some examples, it might require approval from the first player, who owns the in-game item. In other examples, the initiation of the transfer could be automated, driven by predefined in-game rules or settings. This automation may facilitate streamlined transaction process, reducing the need for manual intervention and accelerating the transfer process. In the case of the trade or transfer initiation requiring approval from the first player, this may include several stages or processes. For example, when a second player indicates interest in the in-game item, a notification may be sent to the first player. This notification can detail the interest from the second player, and may include specifics of the proposed transaction, such as the items or currency offered in exchange, or the task to be completed for the transfer. The first player may then have the option to accept, negotiate, or decline the proposed transaction. The acceptance may initiate the transfer of the item under the agreed terms. If the first player chooses to negotiate, they may propose different terms for the transaction, leading to a back-and-forth until both parties reach a mutually agreed set of terms. Declining the transaction would, of course, terminate the proposed deal. In some examples, there may also be an option for the first player to set automated approval conditions. For example, the first player may predetermine that they will automatically accept any offers that meet or exceed a certain value of in game or real-world currency, or any offers that include a specific rare item they are seeking. The system may then automatically approve any transactions that meet these conditions, streamlining the process and allowing transactions to occur even when the first player is not actively engaged with the game.

Figure 5:
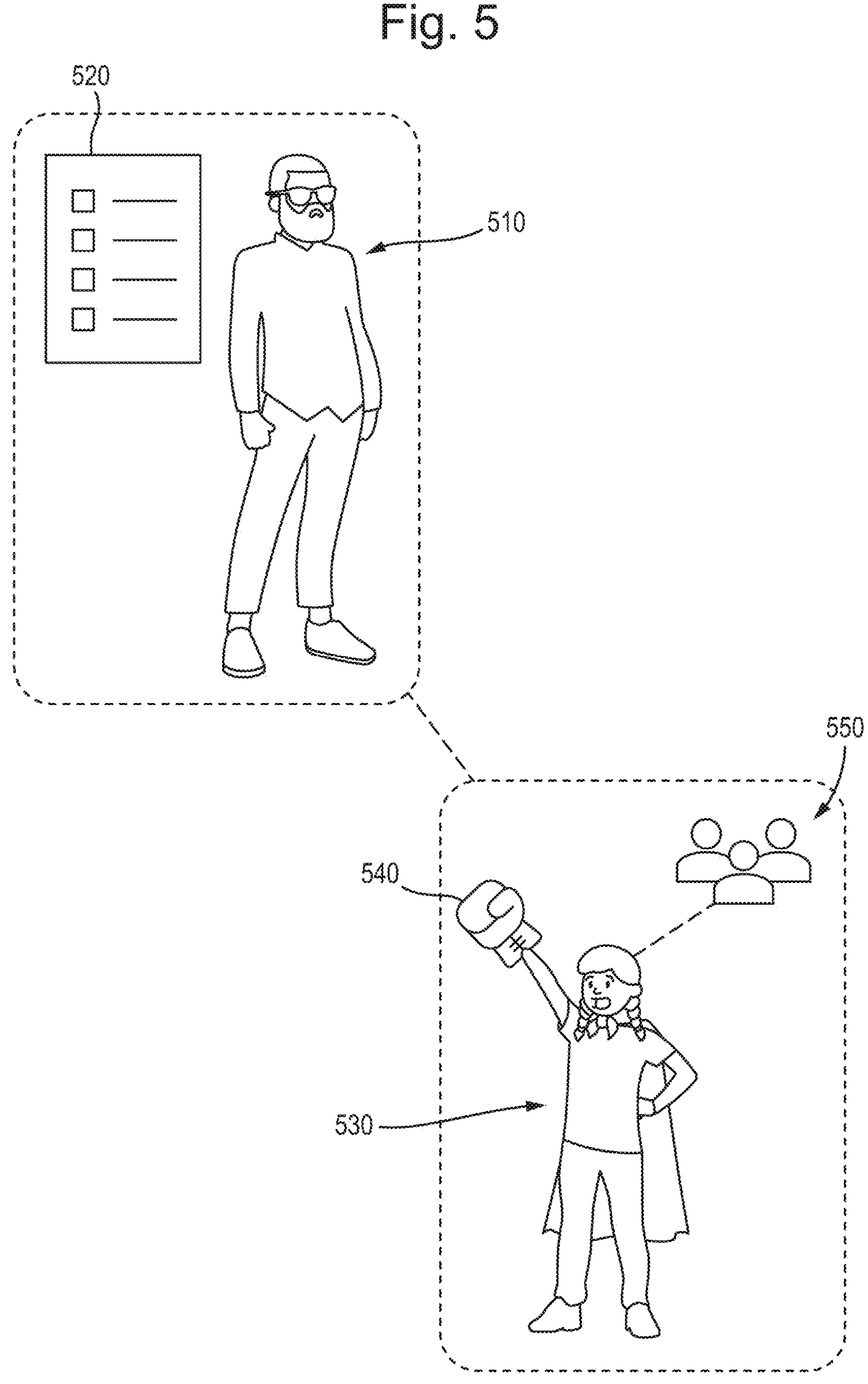
FIG. 5 shows an illustrative example of a scenario involving a first player and a second player from a set of players in a multiplayer video game, suggesting a trial usage of an in-game item.

FIG. 5 shows an illustrative example of a scenario involving a first player 510 and a second player 530 from a set of players 550 in a multiplayer video game. At 520 a representation of the first player's inventory is shown which is comprised of a variety of in-game items. The inventory may provide an organized view of the items owned by the first player.

The second player 530 is testing or "trialing" an in-game item 540 that originates from the first player's inventory 520. This trial feature may allow the second player to explore the functionality and benefits of the in-game item without permanently owning it. This trial usage does not impact the possession status of the item with respect to the first player, ensuring the owner's rights are preserved.

In some examples, while the second player is utilizing the item in the trial phase, the item may be temporarily locked in the first player's inventory, preventing its use, sale or transfer to other players. This safeguard mechanism ensures that the item remains available to the second player for the duration of the trial.

Additionally, during the trial phase, the game system may impose certain conditions or restrictions on the second player. For instance, the second player may not be permitted to earn in-game achievements or rewards while using the trial item. This restriction may serve to maintain balance in the game and prevent misuse of the trial feature.

The game system may also perform predictive analysis based on the collected gameplay data. It may estimate the likelihood of the first player transferring the item or the chance of the second player acquiring it from the first player. These predictions may be based on a variety of factors, including, but not limited to, the players' in-game behavior, the item's popularity among the set of players, and the historical data of similar item transfers.

In some examples, the system analyzes the actions, interactions, and decisions made by the first player and the set of players, recognizing potential patterns and trends that may influence their item transfer tendencies.

Moreover, the system may take into account the item's popularity among the set of players. By gauging the level of demand and interest in the in-game item among potential recipients, the game system may better assess the likelihood of a successful transfer. For instance, if the item is highly sought after by multiple players, the system may predict an increased chance of the first player considering item exchanges. Furthermore, the game system may incorporate historical data on previous item transfers in order to recognize recurring patterns, player preferences, and successful item transactions.

In the event the second player decides to acquire the item, a cooldown timer may be initiated. This cooldown period represents a duration of time during which a subsequent transfer of the same item is restricted. In some examples, upon the transfer of an in-game item, a cooldown timer may be activated. This timer represents a cooldown period during which a subsequent transfer of the same item is restricted. The cooldown period may help maintain game balance and prevent exploitation of the system. The duration of the timer may vary based on factors like item rarity, power level, and game economics. During this cooldown, the item may be usable but non-transferable.

In some examples, the game system may generate notifications for the players based on the gameplay data. For example, if there's a high demand for an item in the first player's possession, a notification may be sent to the first player. Similarly, if an item of high demand is available from another player, a notification might be sent to the second player. In some examples, the game system might generate context-based notifications to inform players about potential item transfers based on the analyzed gameplay data. For example, if the first player possesses an item that the system identifies as having high demand, the first player may receive a notification suggesting the opportunity for a transfer. This may be initiated either by the player expressing an intention to facilitate an item transfer or through the system's analysis indicating that their inventory holds items of significant interest to other players. Similarly, if a sought-after item becomes available from another player, a notification might be dispatched to the interested players (second player and others). This could occur when the game system recognizes that a player's gameplay preferences, style, or past interactions would benefit from acquiring such an item. These notifications aim to facilitate an exchange or transfer of items, helping players optimize their in-game inventories and enhancing their gameplay experience.

Figure 6:
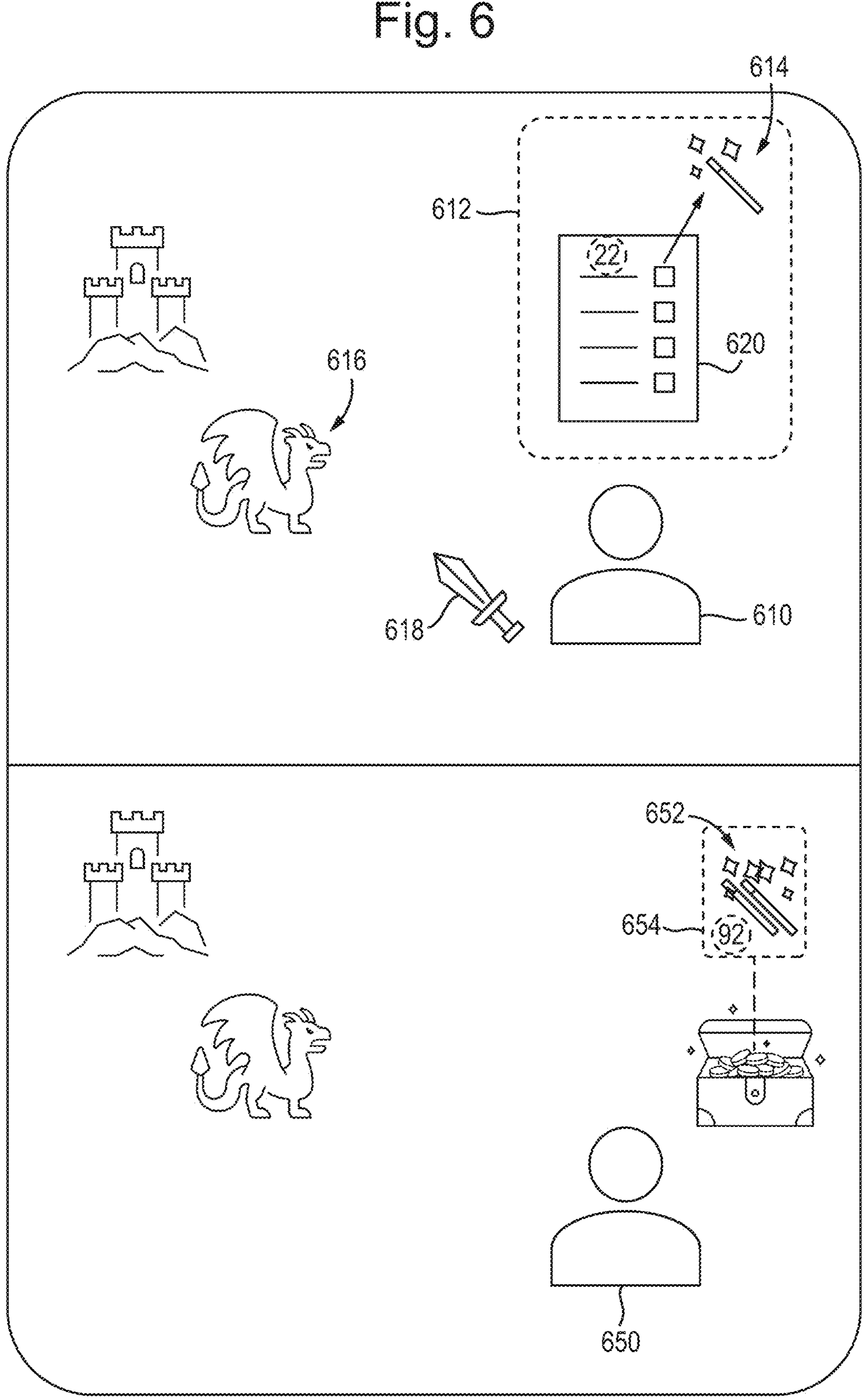
FIG. 6 illustrates an example of an in-game environment where a score is determined for an in-game item.

FIG. 6 presents an example interaction between a first player 610 and a second player 650 from a set of players within a multi-player video game environment. The first player 610 is shown to be equipped with a sword 618. This sword is an embodiment of an in-game item from an item type (combat weaponry). The item is determined to have been utilized by the first player to successfully accomplish a quest within the game. The depiction of the player successfully completing a quest using a particular in-game item emphasizes the player's preferred gameplay style, strategy, and item utilization pattern.

The example of the first player 610 successfully navigating a quest with the use of a specific in-game item, in this case a sword 618, offers crucial insights into the player's gameplay methodology, strategy formulation, and item deployment tendencies.

In this example, the use of the sword 618 may indicate a preference for direct combat-oriented gameplay, showcasing the player's proficiency in weapon-based confrontations and a tendency to leverage physical damage-dealing items.

In other examples, the player might have completed the quest using a stealth-based approach, utilizing items such as invisibility cloaks or silent footwear, indicating a preference for stealth and avoidance strategies.

Similarly, the choice of weapon type may provide further insight into the player's strategic preferences. Some players might prefer long-ranged weapons such as bows or magical staves, others may opt for defensive items like shields, while still others may lean towards close-quarter weapons like swords or daggers. The chosen item may reflect their strategy for tackling in-game challenges and the techniques they likely master.

The pattern of item utilization also conveys further information. For instance, players might use certain items frequently, rarely, or only in specific situations. Observing the first player 610 using the sword 618 throughout the quest suggests a consistent reliance on this item type, which may indicate a comfort level with this gameplay mechanic. In other examples, a player might use a variety of items throughout a quest, indicating versatility and adaptability to different situations within the game.

The quest's successful completion may provide feedback on the effectiveness of the chosen gameplay style, strategy, and item use. It may suggest that the chosen methods are not only preferred but also proficiently executed by the first player 610.

Through these insights, the system may establish correlations between player actions and in-game item types, aiding in the identification of potential item transfers that may be beneficial for other players within the multi-player video game environment.

Following the quest completion, a notification 612 emerges on the game interface tailored specifically to the first player 610. This notification, an embodiment of the in-game display element, may reveal detailed information regarding an additional item within the first player's inventory, labeled 620. Specifically, it highlights a magical wand 614 that the player owns but did not employ in the completion of the recently accomplished quest.

The notification 612, as represented in FIG. 6, serves as an embodiment of the in-game display element. It may show information pertaining to another in-game item associated with the first player 610, particularly displaying the existence of a magical wand 614. Despite being a part of the first player's inventory, this magical wand 614 wasn't deployed for the execution of the recently concluded quest.

In this example, even though the first player 610 primarily utilized a sword 618 to complete the quest, the system, employing an analysis of gameplay data associated with both players, has identified the magical wand 614 as an item of potential interest for the second player 650. This selection may be derived from several factors, such as the second player's past gameplay data, the second player's present gameplay context, and the characteristics of the magical wand itself.

In some examples, both players may have similar gameplay styles and might be facing similar game scenarios. For instance, they both might show a propensity for strategy-driven, direct combat-oriented gameplay. However, the second player 650 might frequently employ magical items such as wands, unlike the first player 610, who seems to prefer swords.

Considering this, the system might determine that the magical wand 614 in the first player's inventory could be particularly advantageous for the second player 650, even though it's infrequently used by the first player. The wand could possess certain attributes, such as casting high damage spells or enhancing certain abilities, which may not align with the first player's strategy but could significantly augment the second player's gameplay in the identified scenario.

In some examples, the system might also suggest the transfer of the sword 618 to the second player, if the sword carries certain properties that align with the second player's gameplay needs and preferences. The sword might be rare, powerful, or possess unique abilities, making it a valuable addition to the second player's arsenal, especially if they are preparing to encounter a similar gameplay scenario.

By this method, the system is not limited to suggesting transfer of items infrequently used by the first player, but may also propose the transfer of items regularly employed by them, based on the match in gameplay preferences and the potential utility of the item for the second player.

The notification 612 may serve multiple purposes. Firstly, it may provide information on the potential interest other players might have in the magical wand 614. This feature introduces the possibility of an item transfer, promoting a cooperative gaming environment. Additionally, it may communicate to the first player that the magical wand 614 holds a significant value within the broader player community, which can influence the player's decision-making concerning the suggested item transfer. In some examples, if the score associated with an item, like the magical wand 614, is exceptionally high for the first player 610, it could suggest that the item is not just valuable for trade but may also be instrumental for the player's own quests or challenges. Upon receiving a notification 612 with such a high score, the first player 610 might be prompted to utilize the item in their gameplay rather than trading it. By choosing to use the item, the player effectively removes it from the potential trade market.

In some examples, the system may employ a scoring system to determine which players from the set of players should receive the identified item via an in-game display element. This score, calculated by the game's underlying system, may represent the relative utility or desirability of the magical wand 614 for each player. It may act as an internal measurement guiding the system's decision-making process.

In this example, a score 654 is higher for the second player 650 than it is for the first player 610. This difference may indicate that, based on the system's analysis, the magical wand could potentially be of greater value to the second player in their upcoming quest.

In some examples, the score may not be directly visible to the players, ensuring that the gameplay experience remains immersive, and the internal mechanics of the game's recommendation system remain concealed. However, it may play a role in identifying possible item transfers that could enhance a player's performance or gameplay experience. In some examples, the score could be made visible selectively. Such visibility may be triggered either by the player's request or under specific game scenarios. For instance the game may provide the first player the capability to actively request recommendations from the game system. If the first player contemplates selling or transferring an item from their inventory, they may initiate a prompt asking the game for suggestions based on the calculated scores of other players. This may result in the game system highlighting potential players who might find the most value from the item.

FIG. 7 illustrates a flowchart depicting steps according to some examples of the disclosure. While the example shown in FIG. 7 refers to the use of system 100 and process 300, as shown in FIG. 1A and FIG. 3, it will be appreciated that the illustrative process shown in FIG. 7, may be implemented, in whole or in part, on system 100 and system 200, or in process 300, either alone or in combination with each other, and/or any other appropriately configured system architecture. The process begins at step 710. Subsequently, decision point 712 determines whether offline data is available. In some examples, offline data may include but is not limited to player actions, item usage, or player interactions that took place while the player was not connected to the game's online servers. If such data is available, the process advances to step 752. Here, the offline gameplay data is accessed, which may include a range of information such as player performance metrics, acquired items, quests completed, and more. The data acquired in this stage may be valuable for analyzing player behavior during periods of disconnected gameplay. From 752, the process proceeds to step 754, where this offline data is synchronized with the existing online gameplay. Following this, the process continues to point 714.

If no offline data is available at decision point 712, the process moves to step 714, where online gameplay data associated with player actions is accessed. This data may span a multitude of parameters, including players' in-game movements, interactions, victories, losses, items used, and more. At 716, the system analyzes the accessed data to draw a correlation between player actions and the types of in-game items, potentially hinting at player preferences, strategies, or styles of gameplay.

Next, decision point 718 determines whether social interaction data is available. Social interaction data may encompass information about player-to-player interactions, communication, cooperation, competition, trade, and more. If such data is available, the process advances to 762, where it accesses gameplay data tied to player social interactions.

At 764, the system determines correlations based on this social interaction data, player actions, and the in-game item types, thereby creating a detailed inventory for each player within the game. The process then progresses to 766, where a suggestion for the transfer of the in-game item between players is made based on the assembled inventory data. Following this, the process continues to point 720.

Should there be no social interaction data at decision point 718, the process progresses to step 720. Here, the system identifies a first player associated with an in-game item that matches the identified in-game item type. This identification may be based on various factors, such as frequency of item use, item possession duration, or the efficacy of the player with the item. At 722, the system calculates a score associated with the in-game item for the first player and a comparable score for a second player. These scores may be based on various factors, such as item utility, player preference, in-game performance with the item, etc.

At decision point 724, the process verifies whether there is a high demand for the item in the first player's possession. This determination may be made based on the scarcity of the item, frequency of its search or request by other players, or its recognized value in the game's community. If there is high demand, the process diverts to 782, facilitating the first player to trigger the generation of an in-game display element, providing a visual prompt about the demand or value of their item.

If there is no high demand at decision point 724, the process advances to 726, where the in-game display element is positioned and oriented within the sightline (or at least the field of view) of a targeted player. This step may incorporate various considerations, such as the player's current in-game location, their viewing angle, or even their gameplay status to avoid obstructing important gameplay information. At decision point 728, the system checks if now is the right time or place to generate the display element. If not, the process returns to 726. If it is the right time and place, the process moves to 730, where the in-game display element is generated, facilitating the transfer of the in-game item between the first player and the set of players. In some examples, the display element may be generated for display out of the sightline or field of view of the targeted player, e.g., when the generation of the display element may interfere with a player action. For example, the targeted player may receive a notification, e.g., at an appropriate time, that a display element has been generated, e.g., at the targeted players base or another location in the gaming environment.

At 732, a suggestion is made for the transfer of the in-game item from the first player to the second player when the first player's score is greater than the second player's score. In some embodiments, this score difference may be set to a particular threshold to trigger the suggestion. At decision point 734, the process checks if the second player has accepted the transfer. If the transfer is accepted, the process moves to 736, where a cooldown timer is initiated. This timer may restrict subsequent transfers of the same item for a specified period, reducing the potential for item hoarding or monopolization. Following this, the process concludes.

If the second player does not accept the transfer at decision point 734, the process diverts to 772. Here, the second player may opt for a trial usage of the in-game item. This trial period allows the second player to assess the utility of the item without affecting the possession status of the item by the first player.

After the trial period step at 772, the process loops back to 717, where the system continues to analyze gameplay data and determine correlations between player actions and in-game items. This cyclical nature of the process ensures that the system constantly adapts to the changing gameplay dynamics, keeping up with new actions, strategies, and item usage patterns emerging among the player community. This maintains the relevance and effectiveness of the item transfer suggestions that the system produces.

Variations to the process may include different factors or conditions being used at each decision point, which may be adapted or updated to the specifics of the multi-player game in question. For example, at decision point 712, instead of checking for the availability of offline data, the system may instead check for the availability of historical data from previous gameplay sessions, or even data imported from other games that the player participates in.

Similarly, the scoring system used at 722 may be varied to include additional parameters beyond player actions, such as player achievements, their social reputation within the game, or factors from outside the game, like player feedback or engagement on the game's online forums.

The process may include additional steps or decision points. For example, following step 737, an additional step may involve providing feedback to the first player about the successful transfer, or even a reward to encourage further such behavior. Similarly, after the trial usage at 772, an additional decision point may check whether the second player wishes to proceed with the item transfer after their trial usage, potentially skipping the loop back to 717 and directly initiating the cooldown timer at 737.

In some examples, systems for facilitating/enabling item transfers may be applied to Virtual Social Interaction Environments (VSIEs), such as social media platforms and the like. These environments may be complex, multifaceted digital landscapes, and may blend elements of gaming and social interaction platforms.

Within a VSIE, users may engage one another through personally configured avatars, reflecting varied user preferences, serving as conduits for diversified social interactions. In this context, an in-game item may represent a range of assets, such as one or more skins and/or other display elements relating to the appearance an avatar. In some examples, the appearance of an avatar may determine how a user is able to interact with another avatar/user within a virtual environment, and/or the virtual environment itself. Additionally or alternatively, an in-game item may represent an access token or permission setting, e.g., that enables a user to access media content in the VSIE, and/or one or more virtual arenas, such as chat groups, market places, pay-to-play events, etc. In some examples, the in-game item may act as an element enabling a user to perform specific actions and/or access different areas or content within the VSIE, potentially altering the dynamics of user interactions and/or how a user is able to interact with the VSIE. Such features allow for the enhancement of user interactions and engagements within the environment, providing users with new avenues for social interaction, collaboration, and content exploration, while preserving the structured nature and inherent rules of the digital landscapes. In some examples, such features may allow for an improvement in the operational efficiency of a VSIE, e.g., by removing or limiting a requirement for an operator of a VSIE to administer the above-described interactions and/or access privileges.

In some examples, the systems and methods disclosed herein may be adaptable to specialized virtual marketplaces, designed for efficient exchange of a variety of professional digital assets, which include, but are not limited to, Computer-Aided Design (CAD) tools, unique coding sequences, and specialized audio-visual effects. In these marketplaces, the disclosed systems and methods may serve as a structured medium, enabling professionals to interact and exchange digital assets and knowledge (which may be classified as in-game items in certain circumstances). For example, in a scenario where a software developer has used a portion of code to demonstrable benefit, that portion of code may be classified as an in-game item. Similar principles may apply to a tool used in CAD program, or media content (e.g., lectures, seminars, presentations, academic texts, etc.) that are useful in an educational environment. In some examples, the implementation of the systems and methods in such marketplaces may include the regulation of in-game items, aligning with the overall design and functional principles of the virtual marketplace. This may include ensuring the visibility, accessibility, and appropriateness of the in-game items, maintaining a balance between user interaction and the preservation of the user experience within the specialized virtual environment.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing, using control circuitry, gameplay data associated with player actions of a set of players in a multi-player video game;

analyzing, using the control circuitry, the gameplay data to determine a performance correlation between the player actions and an in-game item type;

identifying, using the control circuitry, a first player of the multi-player video game associated with an in-game item belonging to the in-game item type having the determined performance correlation with the player actions;

identifying, using the control circuitry, a second player from the set of players based at least in part on the determined performance correlation, wherein the in-game item type is determined to increase performance of the second player;

automatically generating for display, using the control circuitry, an in-game display element targeted to the second player;

accessing, using the control circuitry, data associated with the in-game display element for use in initiating transfer; and causing, using the control circuitry, initiation of transfer of the in-game item belonging to the in-game item type having the determined performance correlation with the player actions from the first player to the second player.

2. The method of claim 1, further comprising:

accessing gameplay data associated with player social interactions of the set of players in the multi-player video game;

determining, based on the gameplay data associated with the player social interactions and the performance correlation between the player actions and the in-game item type, an item inventory for at least one player within the set of players; and causing initiation of transfer of the in-game item between the set of players according to the item inventory.

3. The method of claim 1, further comprising:

accessing an offline gameplay data associated with the player actions of the set of players in the multi-player video game during a period of offline gameplay;

accessing records of item transfers between players participating in a local multi-player video game during the period of offline gameplay; and synchronizing the offline gameplay data with the gameplay data upon re-establishment of an online connection.

4. The method of claim 1, further comprising:

facilitating a trial usage of the in-game item by a second third player from the set of players, wherein the trial usage does not affect a possession status of the in-game item by the first player.

5. The method of claim 1, further comprising:

locating the in-game display element within a sightline of a targeted player of the set of players within the multi-player video game.

6. The method of claim 1, further comprising:

presenting for display the in-game display element based at least in part on a trigger condition, wherein the trigger condition is a gameplay event within the multi-player video game.

7. The method of claim 1, further comprising at least one of:

initiating a cooldown timer associated with the in-game item, wherein the cooldown timer defines a period during which a subsequent transfer of the in-game item is restricted;

generating a notification to the first player when the gameplay data indicates a high demand for the in-game item in their possession;

facilitating the first player to cause a generation of the in-game display element;

determining a number of active in-game display elements within a virtual instance of the multi-player video game for scheduling generation of the in-game display element; or entering a request for the in-game display element into a queuing system to schedule generation of the in-game display element.

8. The method of claim 1, wherein the data associated with the in-game display element for use in initiating transfer comprises information indicative of at least one of:

player engagement with the in-game display element, system state or rule satisfaction relating to transfer, transactional or exchange-related activity, preview or trial usage of an in-game item, presentation or operational characteristics of the in-game display element, recommendation or scoring information, availability or timing constraints, or data from offline or local gameplay sessions.

9. The method of claim 1, wherein:

the generated in-game display element comprises a visual representation of an avatar associated with the second player utilizing the in-game item, and the visual representation graphically indicates a change in a performance attribute of the avatar resulting from the in-game item.

10. The method of claim 1, wherein analyzing the gameplay data to determine the performance correlation comprises:

determining a first correlation coefficient indicating a positive correlation between player success in a specific challenge and usage of the in-game item type;

determining a second correlation coefficient indicating a negative correlation between player failure in the specific challenge and a lack of usage of the in-game item type; and comparing the first correlation coefficient and the second correlation coefficient.

11. The method of claim 1, wherein automatically generating for display the in-game display element comprises:

detecting an existing display surface within a virtual environment of the multi-player video game;

determining that a portion of the existing display surface is within a field of view of the second player; and adapting the in-game display element to fit an environment of the multi-player video game.

12. A system comprising control circuitry configured to:

access gameplay data associated with player actions of a set of players in a multi-player video game;

analyze the gameplay data to determine a performance correlation between the player actions and an in-game item type;

identify a first player of the multi-player video game associated with an in-game item matching the in-game item type belonging to the in-game item type having the determined performance correlation with the player actions;

identify a second player from the set of players based at least in part on the determined performance correlation, wherein the in-game item type is determined to increase performance of the second player;

automatically generate for display an in-game display element targeted to the second player;

access, using the control circuitry, data associated with the in-game display element for use in initiating transfer; and cause initiation of transfer of the in-game item belonging to the in-game item type having the determined performance correlation with the player actions from the first player to the second player.

13. The system of claim 12, wherein the control circuitry is further configured to:

access gameplay data associated with player social interactions of the set of players in the multi-player video game;

determine, based at least in part on the gameplay data associated with the player social interactions and the performance correlation between the player actions and the in-game item type, an item inventory for at least one player within the set of players; and causing initiation of transfer of the in-game item between the set of players according to the item inventory.

14. The system of claim 12, wherein the control circuitry is further configured to:

access offline gameplay data associated with the player actions of the set of players in the multi-player video game during a period of offline gameplay;

access records of item transfers between players participating in a local multi-player video game during the period of offline gameplay; and synchronize the offline gameplay data with the gameplay data upon re-establishment of an online connection.

15. The system of claim 12, wherein the control circuitry is further configured to:

facilitate a trial usage of the in-game item by a third player from the set of players, wherein the trial usage does not affect a possession status of the in-game item by the first player.

16. The system of claim 12, wherein the control circuitry is further configured to:

determine a first score associated with the in-game item based at least in part on the player actions of the first player;

determine a second score associated with the in-game item based at least in part on the player actions of a third player; and cause initiation of transfer of the in-game item from the first player to the third player based at least in part on a comparison of the first score and the second score.

17. The system of claim 12, wherein the control circuitry is further configured to:

locate the in-game display element within a sightline of a targeted player of the set of players within the multi-player video game.

18. The system of claim 12, wherein the control circuitry is further configured to:

present for display the in-game display element based at least in part on a trigger condition, wherein the trigger condition is a gameplay event within the multi-player video game.

19. The system of claim 12, wherein the control circuitry is further configured to perform at least one of:

initiate a cooldown timer associated with the in-game item, wherein the cooldown timer defines a period during which a subsequent transfer of the in-game item is restricted;

generate a notification to the first player when the gameplay data indicates a high demand for the in-game item in their possession;

facilitate the first player to cause a generation of the in-game display element;

determine a number of active in-game display elements within a virtual instance of the multi-player video game for scheduling generation of the in-game display element; or enter a request for the in-game display element into a queuing system to schedule generation of the in-game display element.

20. A method comprising:

accessing, using control circuitry, gameplay data associated with player actions of a set of players in a multi-player video game;

analyzing, using the control circuitry, the gameplay data to determine a correlation between the player actions and an in-game item type;

identifying, using the control circuitry, a first player of the multi-player video game associated with an in-game item belonging to the in-game item type having the determined correlation with the player actions;

automatically generating for display, using the control circuitry, an in-game display element;

accessing, using the control circuitry, data associated with the in-game display element for use in initiating transfer;

causing initiation of transfer of the in-game item belonging to the in-game item type having the determined correlation with the player actions between the first player and at least one player from the set of players;

determining a first score associated with the in-game item based at least in part on the player actions of the first player;

determining a second score associated with the in-game item based at least in part on the player actions of a second player; and causing initiation of transfer of the in-game item from the first player to the second player based at least in part on a comparison of the first score and the second score.

* * * * *